US011873966B2

(12) United States Patent
De Bevilacqua et al.

(10) Patent No.: US 11,873,966 B2
(45) Date of Patent: Jan. 16, 2024

(54) LED LAMP

(71) Applicant: ARTEMIDE S.P.A., Milan (IT)

(72) Inventors: Carlotta Francesca Isolina Maria De Bevilacqua, Milan (IT); Daniele Moioli, Milan (IT); Roberto Franzosi, Milan (IT)

(73) Assignee: ARTEMIDE S.P.A.

( * ) Notice: Subject to any disclaimer, the term of this patent is extended or adjusted under 35 U.S.C. 154(b) by 0 days.

(21) Appl. No.: 17/900,668

(22) Filed: Aug. 31, 2022

(65) Prior Publication Data

US 2023/0072430 A1 Mar. 9, 2023

(30) Foreign Application Priority Data

Sep. 3, 2021 (IT) ........................ 102021000022826

(51) Int. Cl.

| | |
|---|---|
| ***F21S 6/00*** | (2006.01) |
| ***F21V 5/04*** | (2006.01) |
| ***F21Y 105/18*** | (2016.01) |
| ***F21Y 115/10*** | (2016.01) |
| ***F21Y 103/33*** | (2016.01) |

(52) U.S. Cl.

CPC ............... *F21S 6/002* (2013.01); *F21S 6/003* (2013.01); *F21V 5/043* (2013.01); *F21V 5/046* (2013.01); *F21Y 2103/33* (2016.08); *F21Y 2105/18* (2016.08); *F21Y 2115/10* (2016.08)

(58) Field of Classification Search

CPC .. F21V 5/046; F21V 5/04; F21V 5/048; F21S 6/002; F21S 6/003; F21S 6/005; F21S 4/20; F21S 4/22; F21S 4/26

See application file for complete search history.

(56) References Cited

U.S. PATENT DOCUMENTS

| | | | | |
|---|---|---|---|---|
| D698,075 S * | 1/2014 | Klus | D26/138 |
| 9,277,685 B2 * | 3/2016 | Nall | F21V 23/06 |
| 2008/0030981 A1 * | 2/2008 | Mrakovich | G09F 13/22 362/219 |
| 2011/0140589 A1 | 6/2011 | Daniel | |
| 2013/0176734 A1 | 7/2013 | Fussell | |
| 2019/0242563 A1 * | 8/2019 | Xu | F21V 23/023 |
| 2020/0326045 A1 * | 10/2020 | Qiao | F21V 19/001 |
| 2021/0310639 A1 * | 10/2021 | Chen | F21V 23/06 |

FOREIGN PATENT DOCUMENTS

| | | |
|---|---|---|
| CN | 208886462 U | 5/2019 |
| DE | 202010006076 U1 | 7/2010 |
| EP | 3708906 A1 | 9/2020 |

* cited by examiner

*Primary Examiner* — William N Harris

(74) *Attorney, Agent, or Firm* — The Belles Group, P.C.

(57) ABSTRACT

An LED lamp, in particular a table lamp, comprises a lighting head extending about a central axis; the head comprises: a body shaped as a ring about the axis and provided with a substantially annular seat; a plurality of LEDs arranged spaced apart from one another along the seat and about the axis and supported by a printed circuit board positioned in the seat and having a face, on which the LEDs are positioned, perpendicular to the axis; and a lens positioned in front of the LEDs to close the seat; the lens consists of a monolithic piece extending about the axis and has a concave annular inlet surface, facing the LEDs, and a convex annular outlet surface, substantially aligned parallel to the axis and extending about the axis and shaped so as to generate a rotosimmetric light emission about the axis.

7 Claims, 3 Drawing Sheets

LED LAMP

CROSS-REFERENCE TO RELATED APPLICATIONS

This patent application claims the benefit and priority of Italian patent application no. 102021000022826 filed on Sep. 3, 2021, the entire disclosure of which is incorporated herein by reference.

TECHNICAL FIELD

The present invention relates to an LED lamp. The LED lamp of the invention is particularly suitable to be used as a table lamp, but is anyway suited to other uses.

BACKGROUND

It is known that LED light sources are increasingly widespread in the lighting sector. However, the use of LEDs still has some drawbacks, in particular due to the essentially punctiform nature of LEDs and to the consequent difficulties in obtaining homogeneous and uniformly lighted lighting surfaces, but also with high lighting capacity (intensity).

Moreover, in the case of table lamps, where in general a rotationally symmetric emission is preferred, in order to obtain the desired performances, it is normally necessary to resort to particularly complex dedicated optics.

In short, the known LED lamps, in particular the LED table lamps, still seem to have margins of improvement.

SUMMARY

An object of the present invention is to provide an LED lamp that allows overcoming the prior art drawbacks highlighted herein.

In particular, an object of the present invention is to provide an LED lamp that is easy to manufacture and has high lighting homogeneity and uniformity and high lighting efficiency and intensity.

The present invention thus relates to an LED lamp as defined in the appended claim 1.

Further preferred characteristics of the invention are defined in the dependent claims.

With respect to lamps of the prior art, the invention provides a simple and functional solution, which combines in particular a high lighting homogeneity and uniformity with a rotationally symmetric emission, thus being particularly suitable to be used as a table lamp.

BRIEF DESCRIPTION OF THE DRAWINGS

Further characteristics and advantages of the present invention will be clear from the following description of a non-limiting example embodiment thereof, with reference to the figures of the accompanying drawings, wherein.

DETAILED DESCRIPTION

Figure 1:
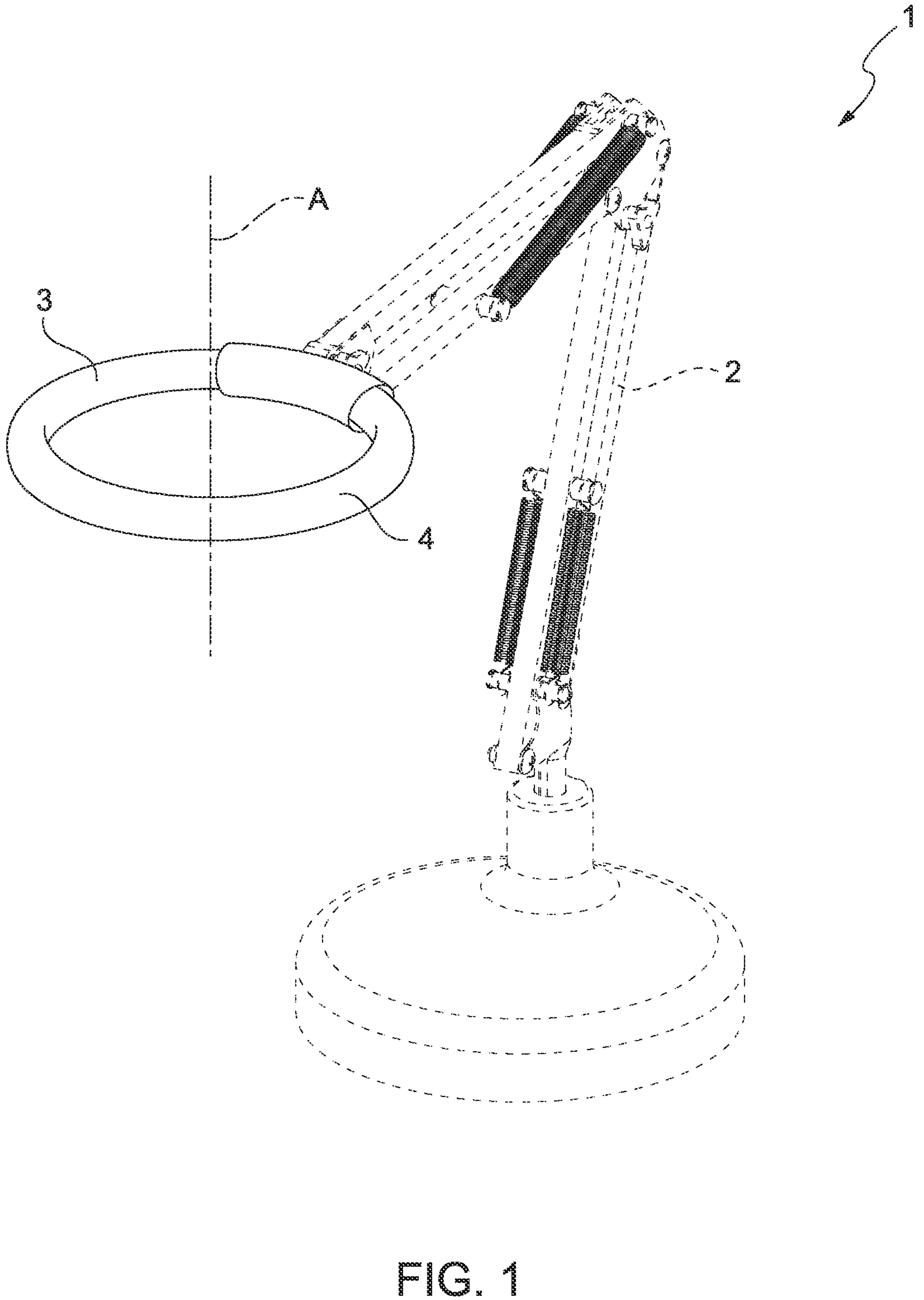
FIG. 1 is a schematic perspective view of an LED lamp, in particular a table lamp, in accordance with the invention.

With reference to FIG. 1, an LED lamp 1, in particular a table lamp, comprises a support structure 2 and a lighting head 3, supported by the support structure 2.

The support structure 2, shown only schematically in FIG. 1, can assume different shapes also depending on the destination of the lamp 1.

The head 3 extends about a central axis A, defining a central symmetry axis of the head 3.

Figure 2:
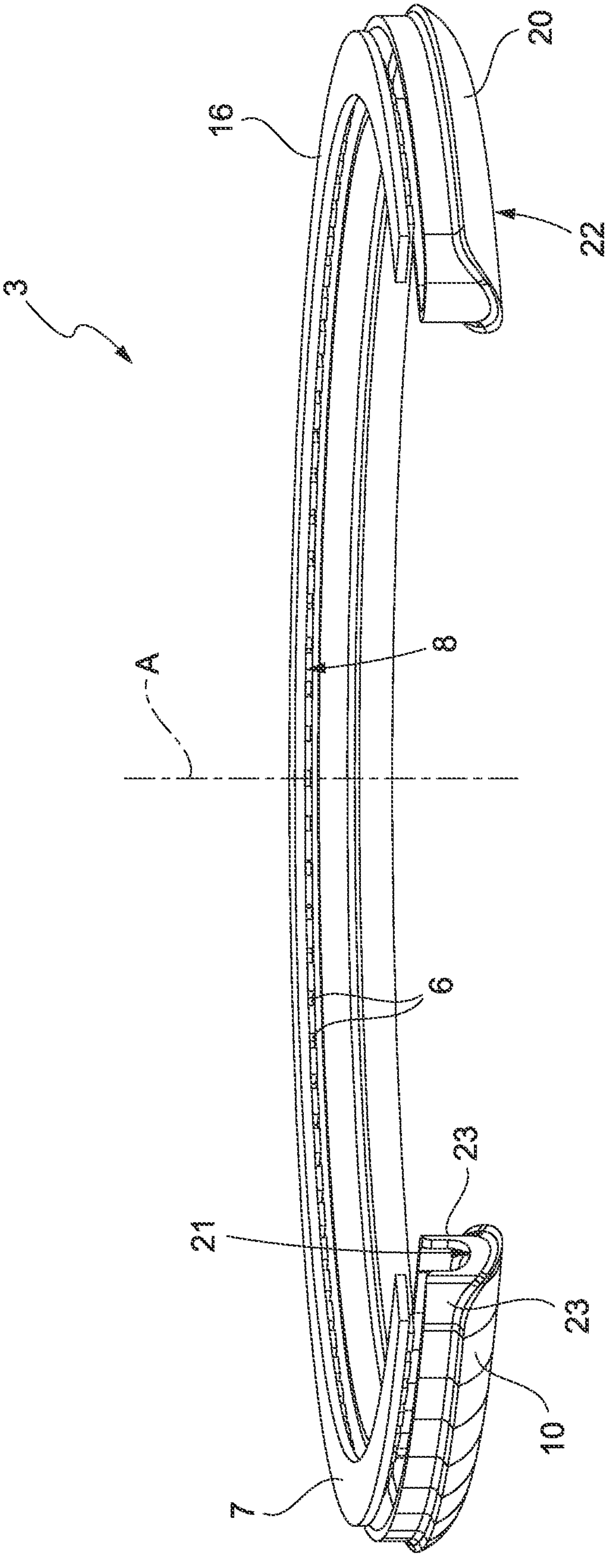
FIG. 2 is a perspective view, with parts removed for clarity, of a component of the lamp of FIG. 1, in particular a lighting head.
Figure 3:
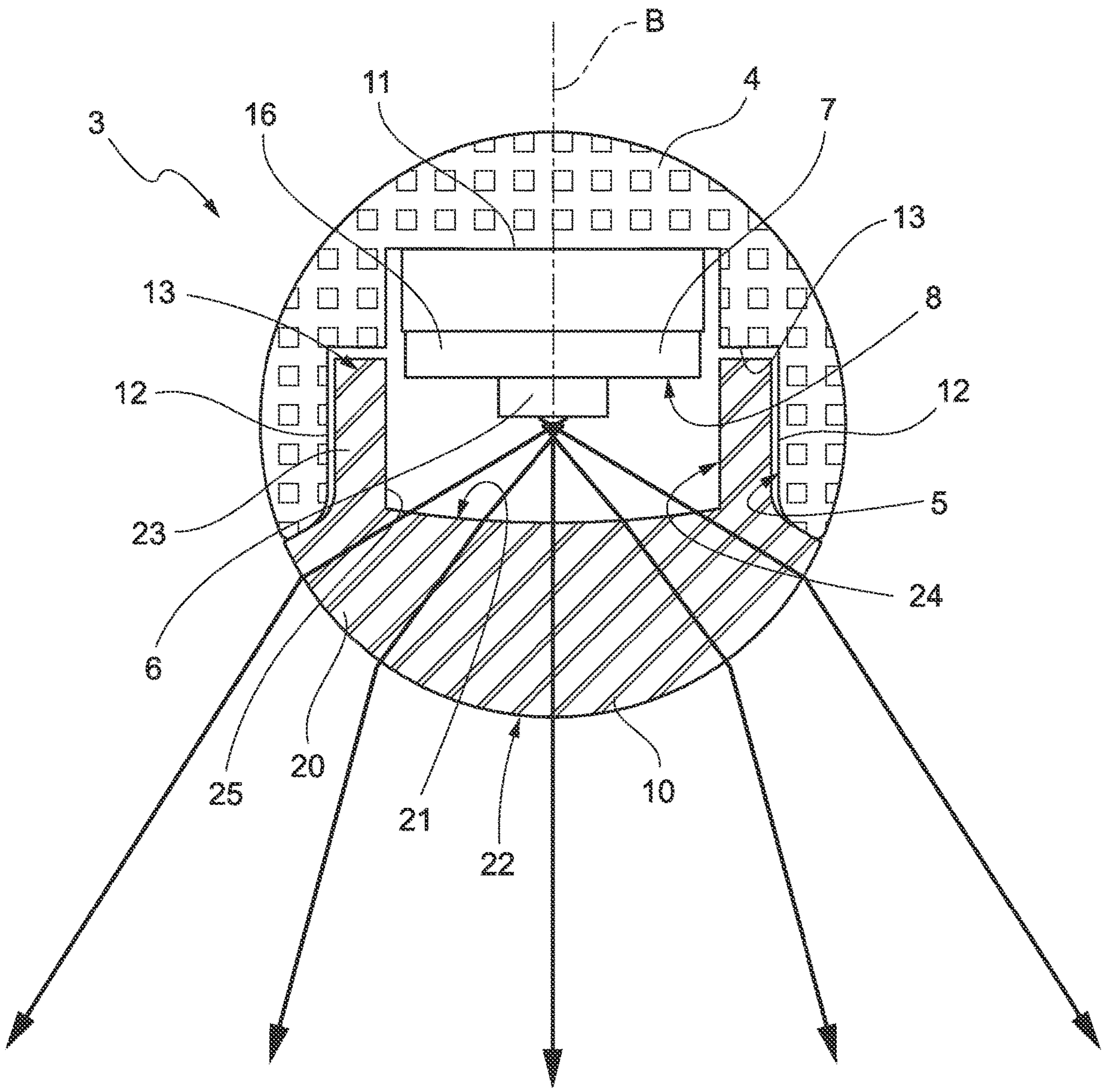
FIG. 3 is a cross section view of the lighting head of the lamp of FIG. 1.

With reference also to FIGS. 2 and 3, the head 3 comprises: a body 4 shaped as a ring about the axis A and provided with a substantially annular inner seat 5; a plurality of LEDs 6 arranged spaced apart from one another along the seat 5 and about the axis A and supported by a printed circuit board 7 positioned in the seat 5 and having a face 8, on which the LEDs 6 are positioned, perpendicular to the axis A; and a lens 10 positioned in front of the LEDs 6 to close the seat 5.

The head 3 has a substantially toroidal shape about the axis A and a substantially circular cross section on a radial plane including the axis A.

The body 4, for example made of aluminum, extends about the axis A and in cross section is substantially shaped like an arc of a circle. It is understood that the body 4, like the head 3 in its whole, can have other shapes, anyway having a central rotation symmetry with respect to the axis A.

The seat 5 has a bottom wall 11, substantially perpendicular to the axis A, and a pair of opposite lateral sides 12, which project from the bottom wall 11 parallel to the axis A.

Preferably, the sides 12 have respective facing recesses 13 that receive the lens 10.

Preferably, the LEDs 6 and the relative board 7 constitute a single LED strip 16 curved as a circular ring about the axis A, formed by a flexible belt that carries a succession of LEDs 6 connected to the board 7.

The board 7 with the LEDs 6 is positioned in the seat 5 between the sides 12. The LEDs 6 are positioned on the face 8 of the board 7 towards the lens 10 and the LEDs 6 are oriented axially parallel with respect to the axis A and extend from the board 7 along respective axes B parallel to each other and to the axis A.

The lens 10 is joined to the body 4 so as to close the seat 5.

The lens 10 consists of a monolithic piece 20 made of a transparent material, for example a polymeric material, in particular PMMA.

The lens 10 extends about the axis A and has a concave annular inlet surface 21, facing the LEDs 6, and a convex annular outlet surface 22, substantially aligned to each other parallel to the axis A and extending about the axis A.

The lens 10, and specifically the inlet surface 21 and the outlet surface 22, are shaped so as to generate a rotationally symmetric light emission about the axis A.

In particular, the lens 10 is geometrically obtained by rotation about the axis A of a cross section, defined on a radial plane including the axis A, in which the inlet surface 21 and the outlet surface 22 have the shape of respective arcs of a circle having respective different radius of curvature R1, R2.

The inlet surface 21 has a radius of curvature R1 greater than the radius of curvature R2 of the outlet surface 22.

Preferably, the ratio between the radius of curvature R1 of the inlet surface 21 and the radius of curvature R2 of the outlet surface 22 is at least 3:1.

In particular, the inlet surface 21 has a radius of curvature R1 ranging between 15 and 35 mm and preferably between 20 and 30 mm; and the outlet surface 22 has a radius of curvature R2 ranging between 5 and 15 mm, preferably between 5 and 10 mm.

In the illustrated example, the inlet surface 21 has a radius of curvature R1 of 25 mm; and the outlet surface 22 has a radius of curvature R2 of 7.52 mm.

The piece 20 further comprises a pair of lateral walls 23 facing each other and projecting from the inlet surface 21 in the seat 5.

In particular, the lateral walls 23 are cylindrical about the axis A and engage respective recesses 13.

The LEDs 6 are positioned between the lateral walls 23 and are spaced apart from the inlet surface 21 and from the lateral walls 23.

The lateral walls 23 have respective inner surfaces 24, facing each other and towards the LEDs 6, covered by a matte white covering layer 25, so as to increase the efficiency.

It is finally understood that modifications and variations can be made to the LED lamp described and illustrated herein which do not depart from the scope of the appended claims.

The invention claimed is:

1. A Light Emitting Diode (LED) table lamp, comprising:

a lighting head extending about a central axis (A), the head comprising a body shaped as a ring about the axis (A) and provided with a substantially annular seat;

a plurality of LEDs arranged spaced apart from one another along the seat about the axis (A), and supported by a printed circuit board positioned in the seat and having a face, on which the LEDs are positioned, perpendicular to the axis (A); and a lens positioned in front of the LEDs to close the seat;

wherein the lens comprises a monolithic piece extending about the axis (A) and having a concave annular inlet surface, facing the LEDs, and a convex annular outlet surface, substantially aligned to each other parallel to the axis (A) and extending about the axis (A), the monolithic piece comprising a pair of lateral walls facing each other and projecting from the inlet surface in the seat, the lateral walls being cylindrical about the axis (A), the LEDs being positioned between the lateral walls and being spaced apart from the inlet surface and from the lateral walls;

wherein the inlet surface and the outlet surface are shaped so as to generate a rotationally symmetric light emission about the axis (A); and wherein the inlet surface has a radius of curvature greater than a radius of curvature of the outlet surface, a ratio between the radius of curvature of the inlet surface and the radius of curvature of the outlet surface being at least 3:1.

2. The LED table lamp according to claim 1, wherein the head has a substantially toroidal shape about the axis (A) and a substantially circular cross section on a radial plane including the axis (A).

3. The LED table lamp according to claim 1, wherein the lens is geometrically obtained by rotation about the axis (A) of a cross section, defined on a radial plane including the axis (A), in which the inlet surface and the outlet surface have a shape of respective arcs of a circle having different radii of curvature.

4. The LED table lamp according to claim 1, wherein the inlet surface has a radius of curvature (R1) ranging between 15 and 35 mm; and the outlet surface has a radius of curvature (R2) ranging between 5 and 15 mm.

5. The LED table lamp according to claim 1, wherein the lateral walls have respective inner surfaces, facing each other and towards the LEDs, covered by a matte white covering layer.

6. The LED table lamp according to claim 1, wherein the lens is made of transparent PMMA.

7. The LED table lamp according to claim 1, wherein the body is made of aluminum.

* * * * *